J. LACHKI.
FENDER BRACE FOR AUTOMOBILES.
APPLICATION FILED DEC. 5, 1910.
999,804.
Patented Aug. 8, 1911.
2 SHEETS—SHEET 1.
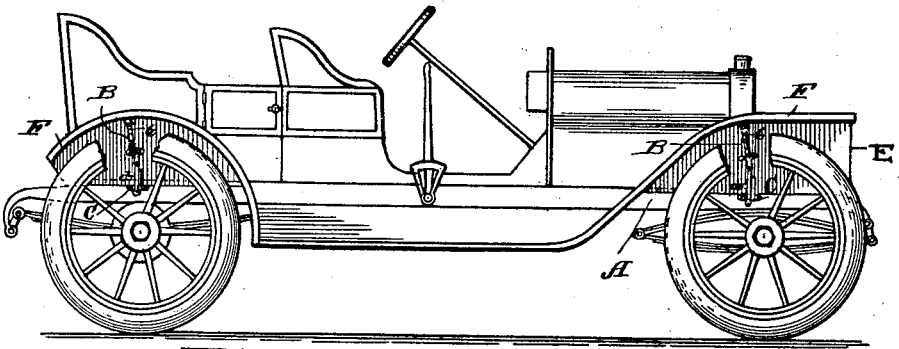
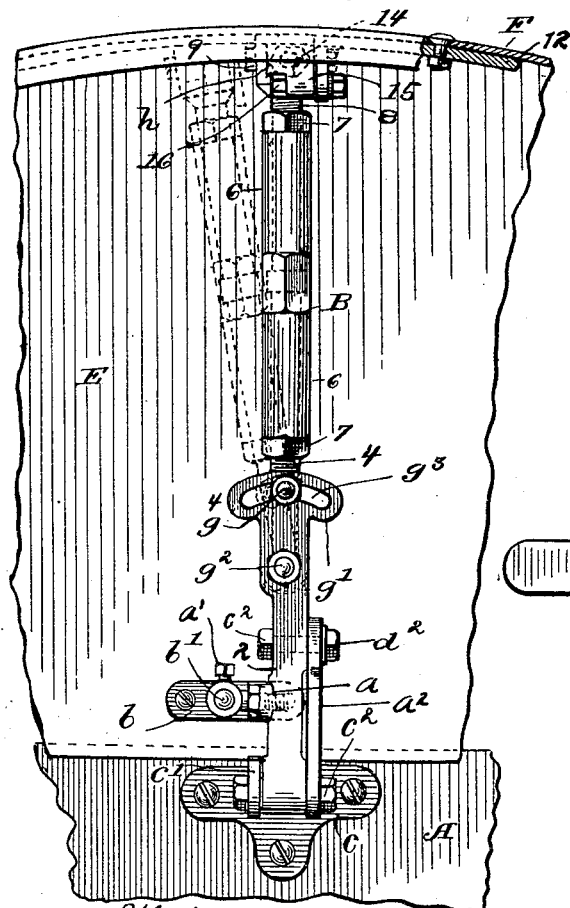
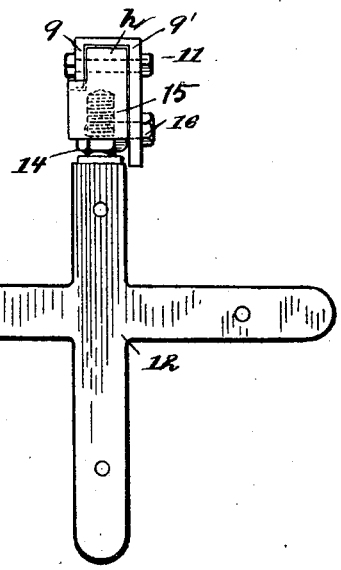
Witnesses.
Inventor.
by Johan Lachki
Fisher & Moore
Attorney.

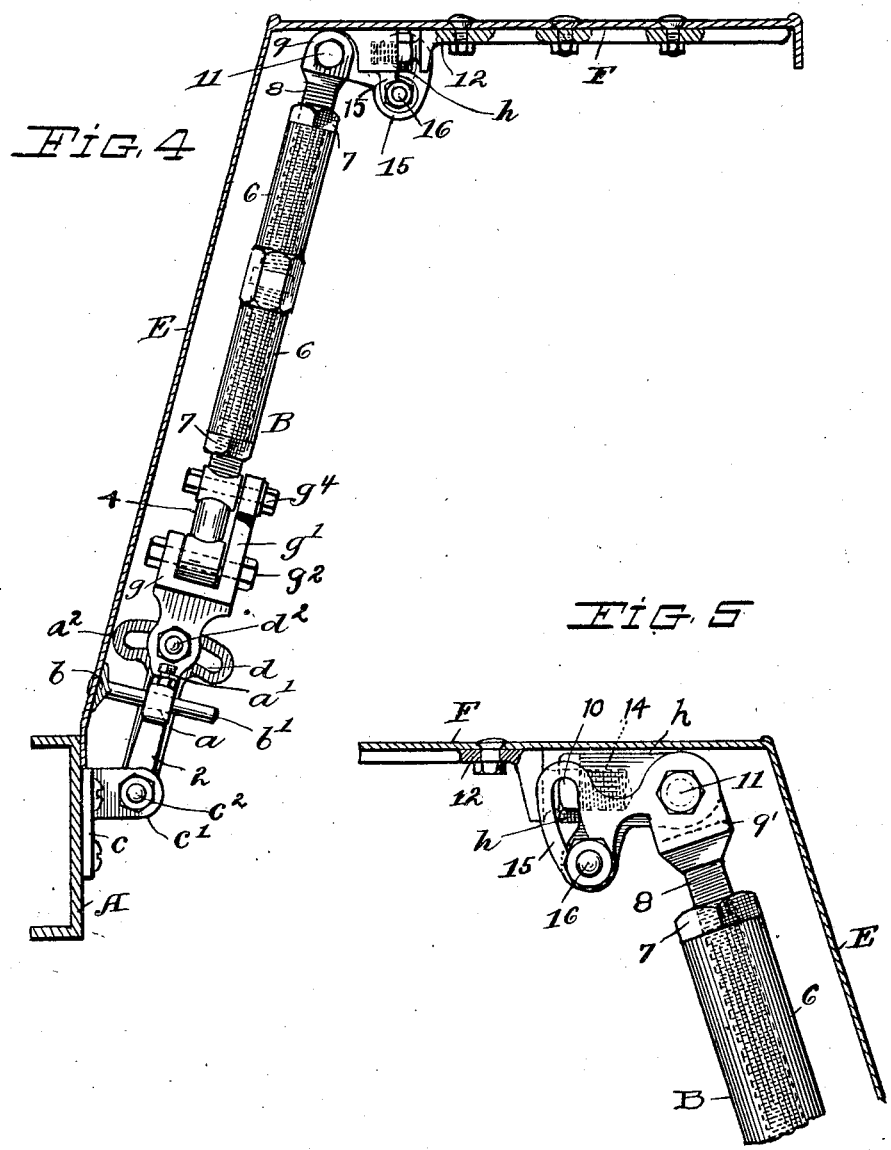

UNITED STATES PATENT OFFICE.

JOHAN LACHKI, OF CLEVELAND, OHIO.

FENDER-BRACE FOR AUTOMOBILES.

999,804.　　　　　Specification of Letters Patent.　　Patented Aug. 8, 1911.

Application filed December 5, 1910. Serial No. 595,821.

*To all whom it may concern:*

Be it known that I, JOHAN LACHKI, citizen of the United States, residing at Cleveland, in the county of Cuyahoga and State of Ohio, have invented certain new and useful Improvements in Fender-Braces for Automobiles, of which the following is a specification.

This invention relates to an improvement in fender braces for automobiles, and the invention consists essentially in a multi-adjustable brace constructed and adapted to operate substantially as shown and described and particularly pointed out in the claims.

In the accompanying drawings, Figure 1 is a side elevation of an automobile embodying my improved braces front and rear. Fig. 2 is a side elevation of one of the braces considerably enlarged over Fig. 1, and Fig. 3 is an elevation of a detail showing the spider bracket which immediately engages the fender. Fig. 4 is a side elevation of the brace and edge elevation of the fender and apron and a cross section of a portion of the machine frame to which the brace is attached. Fig. 5 is a side elevation of the brace looking from the opposite side to that seen in Fig. 4.

Hitherto in this art the part or parts corresponding to the brace shown herein have been not only rigid but non-adjustable so far as I know and believe. That is, each machine has its own length and style of rigid brace for the fender and there was no provision for adjustment thereof in any direction. If, therefore, a larger wheel were to be placed on the machine than the one originally used the brace or braces had to be discarded and new braces employed of a greater length corresponding to the difference in size of wheels.

By the present invention a single brace for each fender for any and all sizes of wheels or other varying conditions is provided and any desired adjustment can be obtained thereby as will hereinafter appear.

Having reference to the drawings, A represents the frame of the machine, and B the brace as a whole.

F is the fender and E the side apron which protects the body of the machine and is engaged with the fender at its upper edge, and in this instance is supported at its bottom by a laterally projecting bracket $b$ having a stem $b'$ locked in a side support $a$ by set screw $a'$, said side support being a separate part in this instance threaded and locked in the primary or first member 2 of the fender supporting standard, whereby said fender and apron are made movable together in respect to the side of the automobile body. The said standard or brace is pivotally mounted on a bracket $c$ which is adapted to be rigidly fixed to the side of frame A and is provided with ears $c'$ through which a bolt $c^2$ projects and serves as a pivot support for the said member 2. One of the said ears is extended vertically in the form of an arm $a^2$ at an inclination as seen in side elevation Figs. 1 and 4 and provided with transverse segmental slot $d$ at its top and a bolt $d^2$ through said member 2 engages in this slot and is adapted to lock the said member in any adjusted position in respect to said slot and arm according to the angle of inclination the brace is to have in respect to the plane of the side of the machine, a normal inclination thereof being presumably shown in Fig. 4. From this midway position the said brace can be thrown inward or outward relatively to the side of the machine according as conditions of construction or operation may require, it being understood that this particular brace is intended to be a universal brace for machines of this general character and is supposed to have adjustability corresponding to all demands that may come upon it for differences in position as different styles of machines may require. The second member or portion of the said brace is represented by 4, and the first member 2 has two ears, $g$ and $g'$ within which the member 4 is secured by a pivot bolt $g^2$, and the said ear $g'$ is extended in the form of an arm and provided with a transverse segmental slot $g^3$ at its top and the bolt $g^4$ through said member 4 engages in said slot and is adapted to fix adjustments of the part 4 in respect to the part 2 but at right angles to the adjustment of said part 2 below. Hence the two segmental slotted parts $a^2$ and $g'$ are at right angles to each other as shown, and between these two adjustments a substantially universal adjustment of the standard or brace is obtained. That is, the said standard can be readily swung inward or outward more or less within the limits of slot $d$, and it can also be swung forward or backward within the limits of slot $g^3$, as indicated in part in Fig. 2. These adjustments are further supplemented by an extension adjustment to give the bracket greater or less length, and to this end the member 4 is screw threaded at its upper end and a member 8 at the top of the standard is screw threaded at its lower end, and the said ends respectively are connected by a turnbuckle 6 of a tubular or sleeve pattern, the threads top and bottom being right and left respectively so that the rotation of said turnbuckle in one direction will lengthen the standard and in the other direction will shorten it, and lock nuts 7 are provided at the end of said buckle. The said upper member 8 has ears 9 with an extension upon one ear forming an arm and having a segmental slot 10, Fig. 5, transversely therein and adapted to provide an adjustment for the so-called spider or bracket 12, Fig. 3, which, in this instance has the shape substantially of a Maltese cross and affords wide spreading and ample support for the fender. A head $h$ is pivoted between the ears 9 and 9' of the said upper member on pivot screw 11 and has a threaded bore adapted to receive the threaded stem 14 of the said bracket 12 and is further provided with a side extension 15 having a lateral bore adapted to receive a screw or bolt 16 which passes through the slot 10 in the arm extension of ear 9' and affords the requisite angular adjustment or swivel arrangement or adaptation of the said bracket 12 as may be required in any given case.

The brace or standard herein described may be used on any road vehicle to which it can be applied, and being intended for various builds of machines which have a wide range of difference in the design and arrangement of their wheel fenders, a practically universal adaptation of brace is required to meet the varied conditions, with possible differences in sizes. The brace or standard proper comprises the parts between bracket $c$ and head $h$ and consists essentially of four separate parts adjustably related one to the other.

What I claim is:

1. An automobile body and a wheel fender extending laterally at the side thereof, in combination with a brace for the fender having a fixed pivot support at its bottom on the side of the automobile body and three several jointed numbers at its bottom constructed to be adjusted at right angled directions one in respect to the other, a turnbuckle connected with the upper of said three members, a fender supporting bracket and a plurality of parts adjustably connected between said fender and said turnbuckle.

2. An automobile body and an apron over the side thereof and a fender for the wheels engaged with the upper edge of said apron and at right angles thereto, in combination with an adjustable brace of said fender pivotally supported on the said body at its lower end and a bracket connection between the lower portion of said brace and the lower portion of said apron, whereby the adjustment of the fender laterally in respect to the automobile body likewise adjusts said apron.

In testimony whereof I affix my signature in presence of two witnesses.

JOHAN LACHKI.

Witnesses:
R. B. MOSER,
F. C. MUSSUN.

---

Copies of this patent may be obtained for five cents each, by addressing the "Commissioner of Patents, Washington, D. C."